US007584074B2

(12) United States Patent
Cousin et al.

(10) Patent No.: US 7,584,074 B2
(45) Date of Patent: Sep. 1, 2009

(54) DIAGNOSTIC METHOD AND SYSTEM

(75) Inventors: Benoit Cousin, Colombes (FR);
Jean-Lois Neyt, Colombes (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/764,954

(22) Filed: Jun. 19, 2007

(65) Prior Publication Data

US 2007/0288794 A1 Dec. 13, 2007

Related U.S. Application Data

(63) Continuation of application No. 11/285,627, filed on Nov. 22, 2005, now Pat. No. 7,409,317.

(30) Foreign Application Priority Data

Dec. 21, 2004 (EP) ................................. 04300930

(51) Int. Cl.
  *G06F 11/30* (2006.01)
(52) U.S. Cl. .......................... 702/183; 701/29; 706/913
(58) Field of Classification Search ................... 702/58, 702/59, 182–185, 188; 701/29, 31–35; 706/911–918
  See application file for complete search history.

(56) References Cited

U.S. PATENT DOCUMENTS

| 4,866,635 | A | * | 9/1989 | Kahn et al. ................... 706/46 |
| 5,107,497 | A | * | 4/1992 | Lirov et al. ................... 714/26 |
| 5,890,080 | A | | 3/1999 | Coverdill et al. |
| 2005/0043922 | A1 | * | 2/2005 | Weidl et al. ................. 702/183 |

FOREIGN PATENT DOCUMENTS

| DE | 19523483 A1 | 1/1997 |
| GB | 2303231 A | 2/1997 |
| WO | 03042769 A1 | 5/2003 |
| WO | 03042918 A2 | 5/2003 |

OTHER PUBLICATIONS

Notice of Opposition filed by Rheinmetall Defence Electronics GmbH re EP Patent 1674958 B1 of International Business Machines Corporation dated Jan. 30, 2009 and English translation of notice.
A. Zuzek et al, "Sequential diagnosis tool", Microprocessors and Microsystems, Mar. 29, 2000, pp. 1-7.

* cited by examiner

*Primary Examiner*—Manuel L Barbee
(74) *Attorney, Agent, or Firm*—Patrick J. Daugherty; Driggs, Hogg, Daugherty & Del Zoppo Co., LPA

(57) ABSTRACT

A method and system comprising a diagnostic symptom tree system for diagnosing a failing system element causing a symptom in a system-under-test. A diagnostic symptom tree comprises symptom roots and dependent lower function nodes and sub-function nodes. Element nodes depend from the function or sub-function nodes, and a plurality of penultimate failure mode leaves depend from the element nodes. The function and sub-function nodes and the failure mode leaves comprise test information. Responsive to positive test results, the diagnostic symptom tree is configured to identify a function or sub-function or element node associated to a lowest symptom tree node or failure mode leaf for which a test is positive, or advise that no failing function or sub-function or element is found. In one aspect of the invention, nodes may include parameter values allowing successive selections of the nodes of the symptom tree for test iterations according to the parameter values.

17 Claims, 9 Drawing Sheets

US 7,584,074 B2

DIAGNOSTIC METHOD AND SYSTEM

REFERENCE TO RELATED APPLICATION

This application is a continuation of previous filed in the United States Patent and Trademark Office by Benoit Cousin and Jean-Lois Neyt on Nov. 22, 2005, titled "DIAGNOSTIC METHOD AND SYSTEM" and assigned Ser. No. 11/285,627, confirmation number 9551.

FIELD OF THE INVENTION

The present invention generally relates to computer aided diagnostic methods and systems applied to systems to be diagnosed, able or not to collect information from internal elements and/or to exchange information with the computer.

BACKGROUND OF THE INVENTION

Computer aided diagnostic methods are more and more used with the extensive integration of electronic and electrical equipment, for instance into motorcars to control engines, braking systems and other on-board systems. For example, the multiplexing technology, used by car manufacturers and suppliers, replaces the numerous hard-wired electrical connections between components by buses. These buses allows for transmission of individual or broadcast messages to and from all components.

The first intent of a diagnostic method is to determine the failure and the action to be accomplished to repair it. The more complex the system for which a diagnostic is required, the more the diagnostic method must be efficient. The use of an efficient method results in saving time, saving money on the parts to be replaced and on skilled people to perform diagnostics. The technician in a garage usually relies on static decision trees for diagnostics. The technician also needs to consult vehicle schematics and parameter readers that he connects to the system to be diagnosed. With this method, except if the technician is particularly expert in a given system, there is no insurance that the appropriate part of the system will be replaced. For complex failures, the technician may use a "trial and error" strategy as he cannot go deeper in the failure analysis.

There is a need for an accurate and efficient computer aided method to save time and to save money on the parts to be replaced while avoiding use of highly skilled technicians to perform diagnostics.

Computer aided methods for failure identification of systems, such as DIAG 2000 from ACTIA, Clip from SAGEM and DIS from Siemens applied to vehicle diagnostic, are available today. They all are implemented with a data repository containing reference information and an engine able to read parameters from the system for which a diagnostic is required. The methods analyze and compute them with data read in the reference data repository to perform the failure identification. According to the type of data stored in the data repository and the algorithm of the engine, the method will have different capacity as for the accuracy and efficiency of the diagnostic, time for processing or the easiness of its adaptation to different systems or its maintenance over time. Basic diagnostic systems use static diagnostic tree similar to yes-no tree while advanced ones use either case based reasoning, model based reasoning or rule based reasoning algorithms which are the known approaches for building Expert systems.

Case based method reasoning consists of matching new problems to "cases" from a historical database and then adapting successful solutions from the past to current situations. Case-based reasoning is a problem solving paradigm that in many respects is fundamentally different from other major AI approaches. Instead of relying solely on general knowledge of a problem domain, or making associations along generalized relationships between problem descriptors and conclusions, CBR is able to utilize the specific knowledge of previously experienced and concrete problem situations (cases). A new problem is solved by finding a similar past case and reusing it in the new problem situation. A second important difference is that CBR also is an approach to incremental, sustained learning, since a new experience is retained each time a problem has been solved, making it immediately available for future problems. When using CBR for a diagnostic determination method, the first step is very fast, it consists in taking a snapshot of a system to be analyzed, which means collection of an amount of parameters characterizing the system at a given time. However, the drawback is that the result is approximate and could be very far from the exact result if the failure problem has not been modeled. This can lead to an error of diagnostic which is not reported as is. The second problem with this method is that the model changes with time and the model accuracy after a while is very difficult to evaluate. This enforces inaccuracy of a diagnostic solution.

In model-based reasoning (MBR), the knowledge base is represented as a set of models of the world rather than a logical formula describing it. Models are parameterized and model-based representation efficiently supports reasoning when varying context information. In order to be operational, with MBR, every object needs to be modeled which may be very costly even if, in the case of an application to a diagnostic method, it is known that some parts or functions cannot be the reason for failure. As the model context needs to be reproduced, with an MBR diagnostic method, the technician in a garage will have to perform a lot of operations to test a specific model. A major problem with MBR applied to a diagnostic method is that the models should evolve with the time to adapt to an evolving complex system, such as a car engine. In this case, the method does not give a way to evaluate the model changes.

Rule-based expert systems are also used. Using a set of assertions, which collectively form the 'working memory', and a set of rules that specify how to act on the assertion set, a rule-based system can be created. Rule-based systems are fairly simplistic, consisting of little more than a set of if-then statements, but provide the basis for so-called "expert systems" which are widely used in many fields. The concept of an expert system is this; the knowledge of an expert is encoded into the rule set. When exposed to the same data, the expert system AI will perform in a similar manner to the expert. The main problem with an RBR diagnostic determination method is that the number of rules is so important that the database becomes rapidly unmanageable. As an example, if the system comprises 47,000 parts, the number of rules can grow up to 47,000 multiplied by the number of possible configurations.

Consequently, there is a need for an efficient guided diagnostic method, accurate, realistic in terms of database size and where content can be entered and maintained easily over time.

SUMMARY OF THE INVENTION

A method and system for diagnostic symptom tree system for diagnosing a failing system element causing a symptom in a system-under-test are provided. A diagnostic symptom tree comprises symptom roots and dependent lower function nodes and sub-function nodes. Element nodes depend from the function or sub-function nodes, and a plurality of penultimate failure mode leaves depend from the element nodes. The function and sub-function nodes and the failure mode leaves comprise test information. Responsive to positive test results, the diagnostic symptom tree is configured to identify a function or sub-function or element node associated to a lowest symptom tree node or failure mode leaf for which a test is positive, or advise that no failing function or sub-function or element is found. In one aspect of the invention, nodes may include parameter values allowing successive selections of the nodes of the symptom tree for test iterations according to the parameter values.

It is another object of the invention to provide an assisted diagnostic method which computes a result with a minimum participation of technical assistance and in a minimum period of time.

In one aspect of the invention, these objects may be achieved with a system and a computer aided method to diagnose a failing part corresponding to a symptom in a system comprising elements grouped in functions and sub-functions, said method being executed with the help of an operator performing local operations on the system and interfacing the computer, said method comprising the steps of defining and storing symptom trees of the system, each symptom tree being mapped on the split of the system into functions, sub-functions, elements which are the repairable units of the system and failure modes of these elements. The nodes include test description, the computer performing the tests of the tree until a failing node is found.

Optionally, the nodes may include parameter values, such as the type of the system or other values, allowing successive selections of the nodes of the symptom tree for successive test execution iterations according to the parameter values.

If the system comprises controlling elements able to collect system variables and able to communicate with the computer, the symptom tree nodes may store automatic tests. These automatic tests are first executed before the other tests. These automatic tests, when found positive, are confirmed by a manual confirmation test performed by the operator.

One advantage of the method is that the method can easily be adapted to different systems for which the diagnostic is performed.

Another advantage of the method is that it delivers a guided diagnostic independent of the diagnostic skills of the technician using it.

One other advantage of the method is that it is easy to maintain content over time.

One other advantage of the method is that the method can be applied to systems able or not to collect information from internal elements and to exchange information with the computer.

Another advantage of the present invention is to provide a method that is predictable, in the sense that it will either converge to the identification of a failure or the conclusion that the failure is not known to the system. The method will not try to perform an educated guess.

One other advantage of the method is that the authoring effort to fill data in the diagnostic method database is medium for a first system and low for the following systems.

One other advantage of the method is that the methods of the prior art require end-to-end vehicle experts and even with mathematical understanding (with MBR methods), whereas the method of the present invention only requires vehicle experts, domain users and technical advisor because the system is easy to understand, the decomposition being "natural".

One other advantage with the method of the present invention is that the field experience can be easily integrated in the data. It can be done automatically via the weights and manually via a structured functional decomposition. With CBR methods, the field experience is integrated on an unstructured basis. MBR methods allow only a few or no field experience integration and, with decision tree based methods, a manual integration is possible but may require the trees to be rearranged.

The diagnostic method described hereunder is based on a functional decomposition of a symptom into functions, sub-functions and replaceable units associated to failure modes. Building a symptom tree does not require expertise in the behavior of the system to be diagnosed, but just requires knowing how the system works. This is simpler than with the method of prior art requiring expertise in problems with the system to be diagnosed to build the diagnose tree.

Another advantage of the method is its ability to provide a guided diagnostic on an incomplete content, i.e. a full decomposition of a symptom into all its potential root causes is not needed to perform diagnostic. This is a major advantage.

The performance with the diagnostic method of the present invention is very high due to internal dynamic weight calculation and non-sequential facilities (for example, the system detects a disconnected connector or a faulty sensor. The system can point out these failures straight away without asking the user to go through a complete sequential diagnostic procedure). This is to be compared to CBR methods wherein with which the performance increases only if the number of cases is increased and with MBR methods which necessitate very high calculation facilities. With decision tree based methods, the performance is low in average due to the sequential approach.

The computing requirement is low with the method of the present invention, high with the CBR methods, very high with MBR methods and very low with decision tree based methods.

The cost to diagnose is low with the method of the present invention as the operations and replaceable units are easily included in the system, whereas with CBR methods, they are difficult to include and would induce combination factoring. When including new operations and replaceable unit costs in the system, complexity of the model increases with the MBR methods. It is difficult to include new operations and replaceable unit costs with the decision tree based methods as the decision trees are independent and sequential.

With the method of the present invention, the efficiency of the technical helpdesk is improved compared to the methods of the prior art as the call center can know from the databases which vehicle functions have been successfully tested or not. With CBR methods, the helpdesk improvement is low. The technical helpdesk is hard to understand with the MBR methods and the decision tree based methods are of little help to the technical helpdesk.

Globally speaking, the overall efficiency of the diagnostic method of the present invention is very high compared to the methods of prior art which are low for CBR methods, medium for MBR methods and very low for decision tree methods.

One other advantage of the method, in a preferred embodiment, is to enable the content author to introduce different parameters attached to the replaceable units, such as spare parts cost to help the system in determining the optimum part to be replaced.

One other advantage of the method is the fact that the technician in the garage has no need of being very skilled in the comprehension of the system for which a diagnostic is performed to use the method.

DETAILED DESCRIPTION OF THE PREFERRED EMBODIMENT

Figure 1:
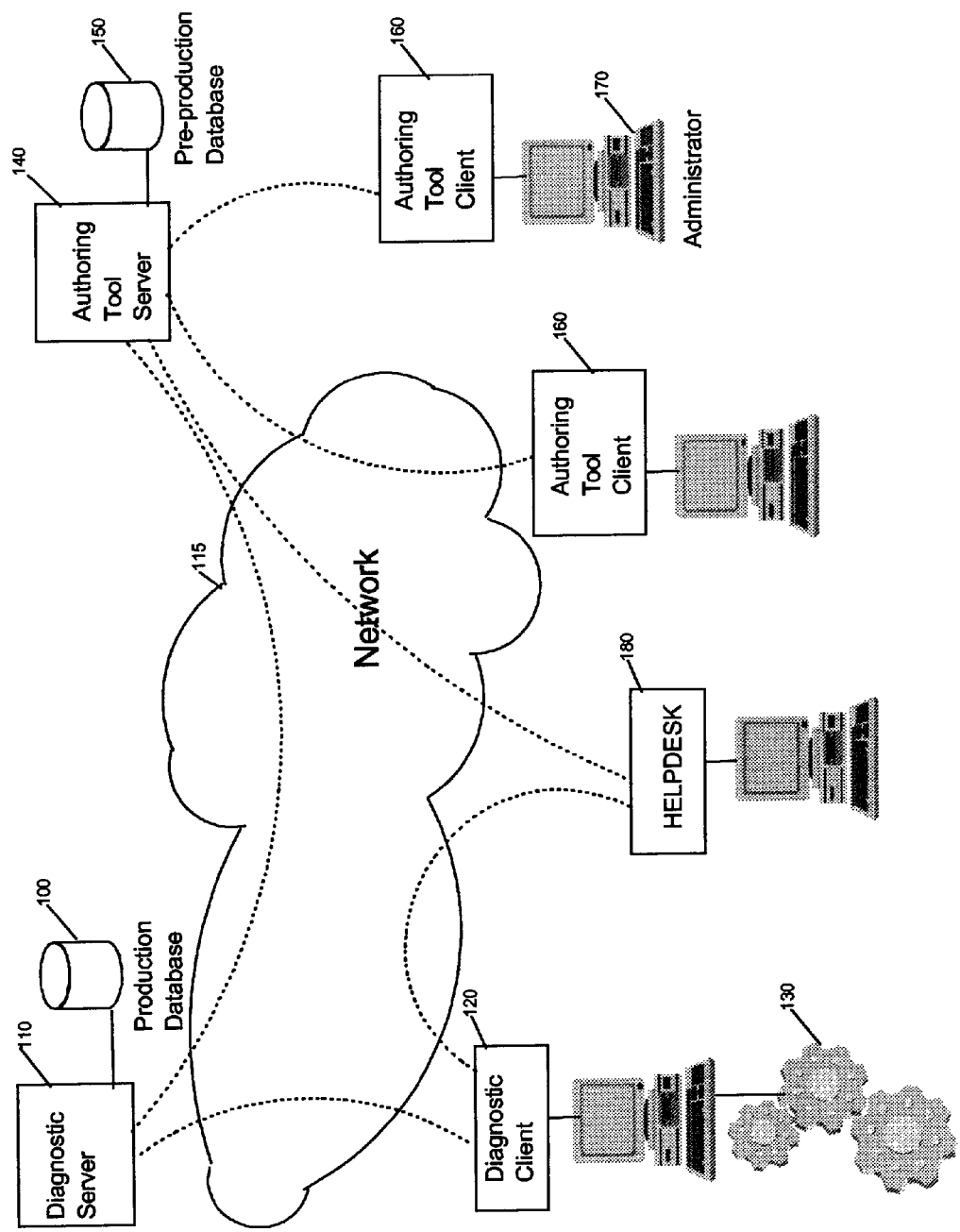
FIG. 1 illustrates the overview of the computing system for operating the diagnostic method according to the preferred embodiment.

FIG. 1 illustrates the environment of the method of the invention according to the preferred embodiment which allows, starting from the symptoms of a problem, to identify the smallest replaceable or repairable unit in an automated system (130), such as a car which includes testable components, some of them being uniquely testable through a controller of the system. If the system is a car, the car is usually located in a garage and the technician has a workstation operating the client side (120) of a client server diagnostic application. The workstation is connected to the diagnostic server (110) through a network (115) which can be an Internet network. Through a dialog, the technician is guided to test or set elements of the system in a status which allows the diagnostic server to obtain the right information and reach a conclusion on the solution. The diagnostic server uses a production database (100) for diagnostic data. This database (100) is a shadow of the last operational level of the pre-production database (150) which is prepared on an authoring tool server (140) which can be in a site remote from the production site. In the preferred embodiment, the authoring tool for production computing environment preparation is a client-server application, the authoring tool user in this case operating the authoring tool client application (160) from a she which may be remote. A specific authority is given to the experts and people in charge of maintenance to access the authoring tool for installation and maintenance of the system according to the preferred embodiment. A specific authority in the system is given to an administrator (170) accessing the authoring tool client application also in charge of tuning the parameters of the diagnostic database. He may decide when to switch from the pre-production to the production database. The helpdesk (180) workstation is in communication with the end users (the technicians in the garages for car diagnostics) to help in the use of the diagnostic client application and in collecting the unsolved failures (there is no case where the failure is unsolved by the system and where the system gives an approaching solution anyway). The helpdesk communicates with the authoring tool server to reflect the unsolved failure, the maintenance people in this case modifying the data with the help, if necessary, of the experts. The helpdesk may not operate the authoring tool client application as represented in FIG. 1 but the information they enter in the authoring tool server can be accessed through the authoring tool client application.

Figure 2:
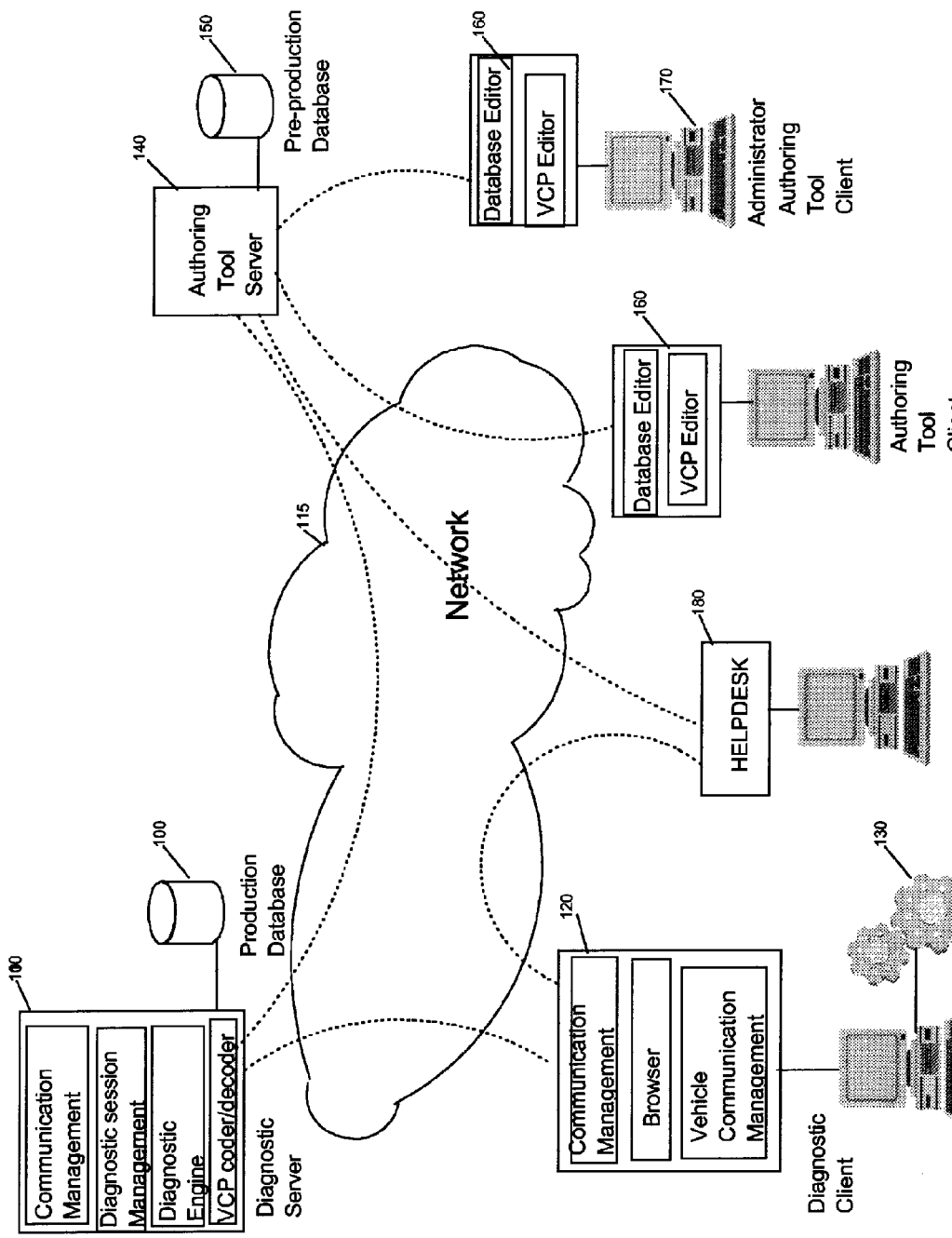
FIG. 2 illustrates the various software logical layers involved in the diagnostic method of the preferred embodiment.

FIG. 2 locates the software layers in the system implementing the method of the preferred embodiment. The diagnostic client application (120) comprises a first layer, the communication management layer, for communication with the back-end server. The diagnostic client application (120) comprises a standard browser in the preferred embodiment for collecting information through the Internet network and a vehicle communication management which supports communication between the application and the car (130). More generally, this layer supports the communication protocol inside the automated system (130) used for command and data collection by the controller.

On the diagnostic server side (110), the vehicle communication protocol (VCP) coder/decoder allows sending/receiving commands and data to/from the client diagnostic application directly understandable by the car. The diagnostic engine is the heart of the diagnostic method; it accesses the production database (100) and processes the diagnostic rules. The communication management layer is used for communication between the diagnostic engine and the diagnostic client.

The authoring tool client application (160) comprises a database editor for modifying the graphed networking nodes and arcs of the pre-production diagnostic database. It comprises also a VCP editor for vehicle communication protocol command and data preparation used for execution of diagnostic tests by the diagnostic application.

Figure 3:
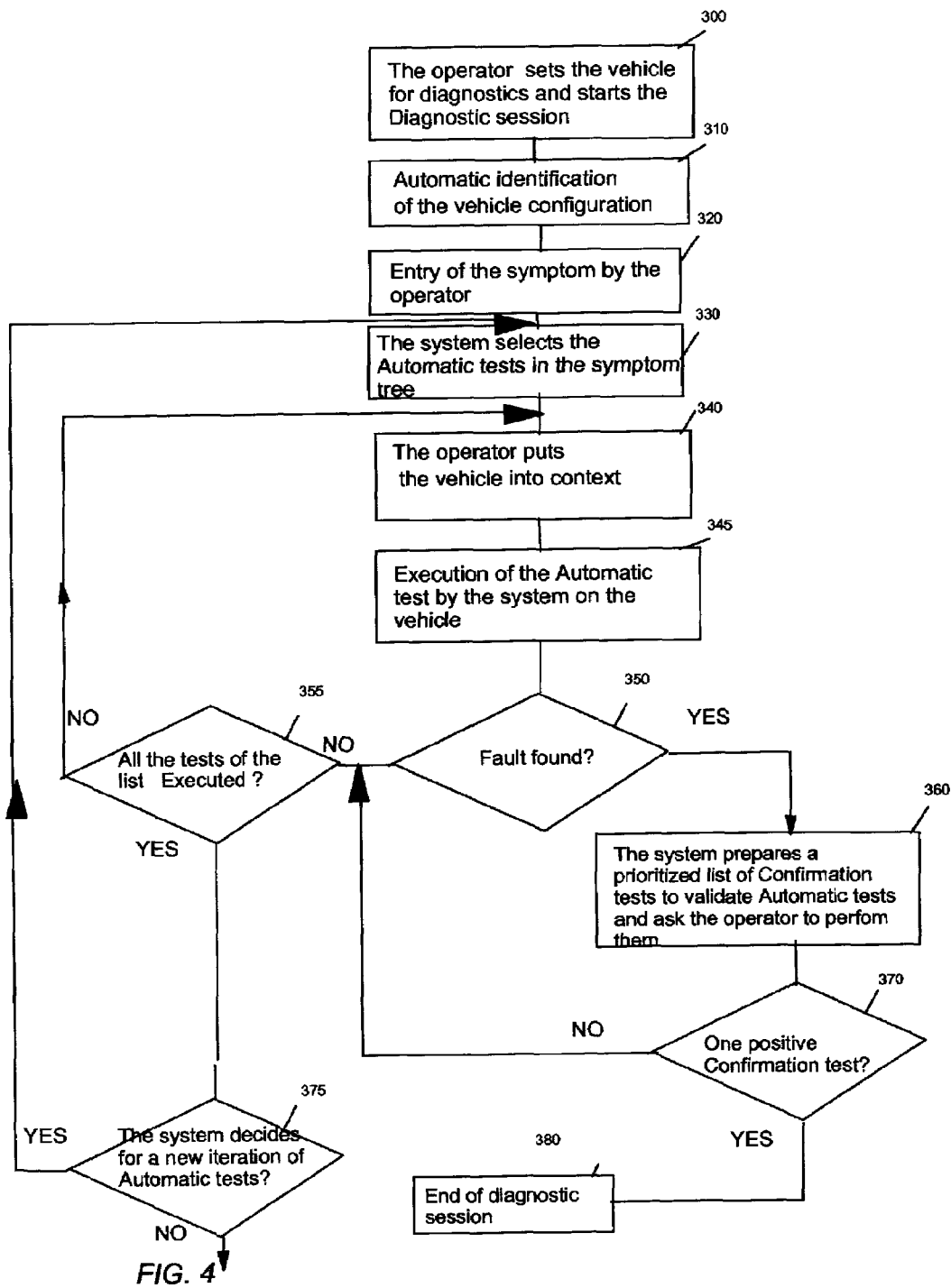
FIG. 3 and FIG. 4 illustrate the steps of the diagnostic method as practiced by the operator of the automated system.

FIG. 3 illustrates the diagnostic steps of the method performed by the operator who is a garage technician using the diagnostic client application (120) connected to a car having a symptom of failure. The operator sets the vehicle for diagnostic (300) which consists in the preferred embodiment in connecting the vehicle to a PC operating the client diagnostic application and in turning the engine key on. Then the operator starts the client diagnostic application session (300). The diagnostic application automatically identifies the vehicle configuration (300) by reading the vehicle identification number (VrN) and then generating a list of all the electronic control units (ECU) which are the controllers of the vehicle, in line with the type of vehicle uniquely identified through its VIN. The diagnostic application automatically performs the detection of all the ECUs of the vehicle by sending a vehicle communication protocol (VCP) request and waiting for a positive answer. The diagnostic application retrieves the vehicle configuration data available in onboard ECUs. In conclusion of step 310, the system has built a precise image of the vehicle configuration by combining all these collected data. The as-build vehicle configuration, available from the end-of-line bill of material database, is also used to consolidate the vehicle configuration. It is noted that this database is a standard database held by all the vehicle manufacturers.

Through a graphical user interface on his workstation, the technician (120) is requested to select the symptom (320) of the failure. This entry is guided as the symptom belongs to a category/subcategory of symptoms. Even if not mentioned in FIG. 3 for clarity reasons, it is noted that if such a symptom is not proposed by the system, the technician must call the helpdesk and the diagnostic process is ended. When the symptom is entered, the diagnostic application automatically builds a corresponding symptom diagnostic tree adapted to the vehicle configuration. A symptom tree is built by performing a splitting of the functions of the vehicle based on the vehicle configuration. The symptom tree root is a symptom and from the root to the leaves the tree splits into functions and sub-functions and so on, until a repairable unit is reached, the leaves being the different failure mode associated to this repairable unit. As explained later in the document in relation to FIG. 5 and FIG. 6, the symptom tree is extracted from a diagnostic database containing all the symptoms trees created and maintained by the diagnostic content authors. For building the symptom tree, the system chooses the corresponding symptom tree in the diagnostic database and prunes the nodes which do not correspond to the vehicle configuration. The inputs of the system for dynamically building the symptom tree are both the diagnostic database and the image of the vehicle configuration just built by the system after the step of the operator electing a symptom. In the diagnostic database, the content authors have the possibility to associate tests to each node. Each failing function, sub-function, repairable input or failure mode can be tested. A test is automatic when it requires no intervention from the operator besides setting the vehicle in the context in which the test will be performed. An automatic test is performed by evaluating logical expression based on parameters retrieved from the control units from the vehicle. A positive automatic test is considered as validating a hypothesis (being represented by the function, sub-function or failure mode associated to it). Validation of an automatic test is performed via confirmation test. An example of a confirmation test for confirming an automatic test is fixing the failing suspected unit and checking that the symptom has disappeared.

Figure 7:
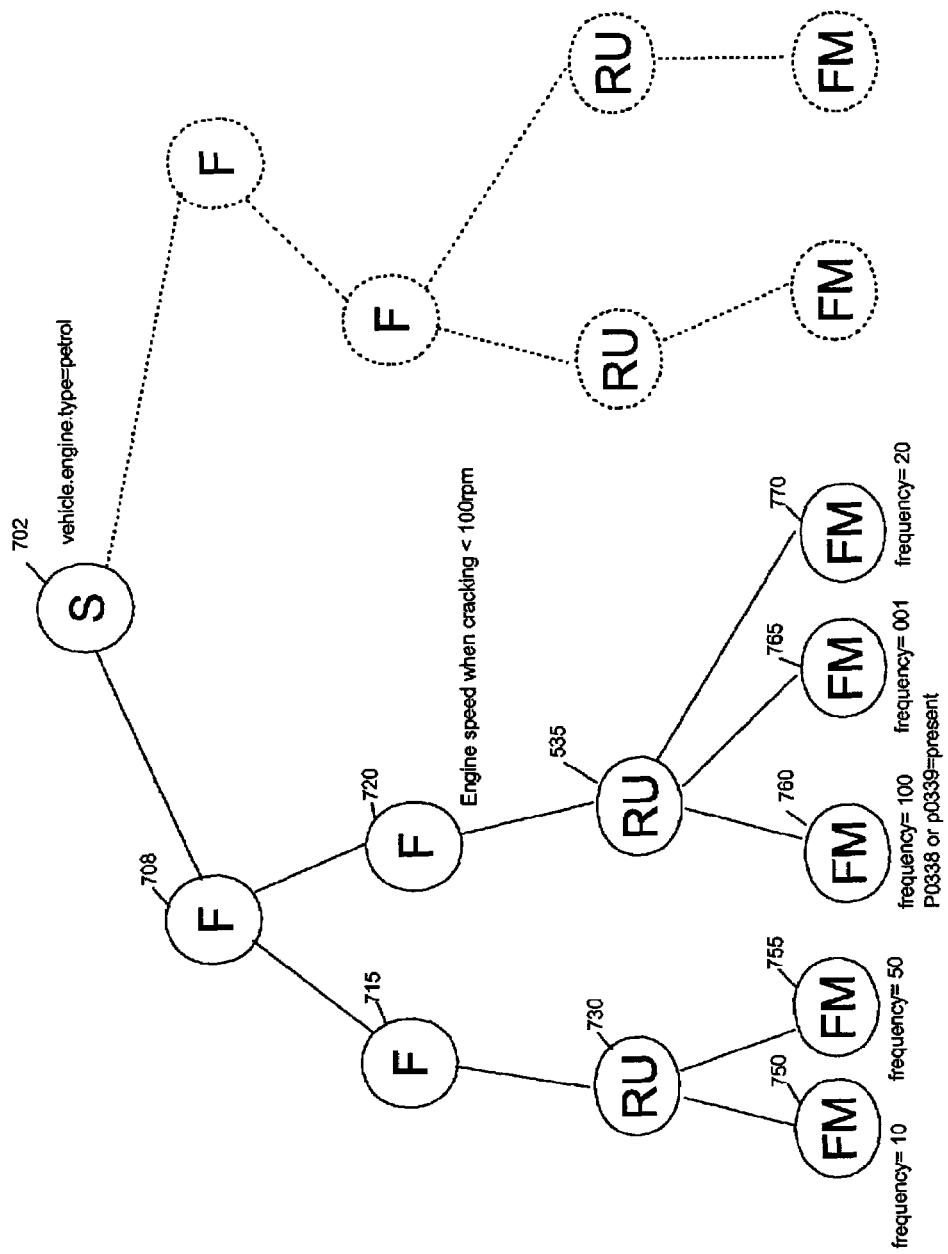
FIG. 7 is an illustration of the parameters associated to the nodes of a symptom tree according to the preferred embodiment.

It is noted that the cost of a test is much higher if performed manually instead of automatically, as it implies an implicit technician intervention. There are also great differences in cost between various settings into context of an automatic test which require an action from the operator. All the information of cost for testing operation is entered by the content authors as parameters of the symptom tree nodes. These parameters are used by the system to make prioritization between the series of tests to be performed. The diagnostic application decides which automatic tests will be performed. As seen later at step 355, the tests can be performed via more than one iteration or phase. An automatic test requires first that the operator sets the context of the test; one test phase can be performed for low cost context setting automatic tests results in the symptom tree and one iteration for high cost context automatic tests. One example of low cost setting into context is "put the ignition on" which does not require dismantling of parts. Many embodiments of the method are possible on the same principle. In the preferred embodiment, in reference to FIG. 4, there is a last iteration of tests which are the most costly tests as being based on manual procedures performed by the operator. In the case where the engine or, more generally, the system to be diagnosed is not able to collect information from internal elements and/or to exchange information with the computer, the only possible iterations are based on manual procedures which can be chosen as more and more costly in the successive iterations. FIG. 7 and following ones, later in the document, describe how the system exploits the information entered by the administrative people and stored in the symptom tree nodes to define different test phases corresponding to test list execution iterations. The prioritization of tests can be based on different criteria, such as the cost or the frequency of occurrence attached to a failure mode node etc.

Coming back to the step (330) of selection of automatic test nodes in the symptom tree, the diagnostic application extracts from the symptom tree corresponding to the configuration of the vehicle, all the parameters and diagnostic trouble codes (DTCs) that must be read from the vehicle under investigation for performing the automatic tests of the list. DTCs are trouble codes stored in the memory of electronic control units (ECUs). These trouble codes characterize the result of embedded self diagnostic of the ECUs. For each test, the operator is required to put the vehicle into context (340). The diagnostic application executes the automatic tests (345) by evaluating logical expressions built from these parameters and DTCs and analyzing the results. When one or several logical expressions are true, a fault is found (answer Yes to test 350) and the system prepares a prioritized list of confirmation tests and asks the operator to perform them (360). A confirmation test is associated to each node of the symptom tree and is executed to validate a node (a function, a sub-function, a repairable unit or a failure mode). A confirmation test is a test based on a manual procedure of the operator which is performed by the operator to validate the positive result of an automatic test. If the automatic test has been confirmed (answer Yes to test 370), a faulty repairable unit is found, the technician is asked to replace or repair the faulty unit, and the diagnostic session is then ended (380).

The prioritization of confirmation test list is based on algorithms that the system can compute on the basis of parameters read in the node of the symptom tree. These parameters can be the test cost or the frequency of occurrence attached to a failure mode node etc. It is noted that these parameters can be entered by the administrative people maintaining the diagnostic database or may be maintained automatically by the system.

It may happen that after execution of all the automatic tests (answer Yes to test 355), no parameter or DTC to be read is found (answer No to test 350) in the diagnostic tree in association with the vehicle configuration. It may also happen that the confirmation test does not succeed (answer No to test 370) and there are no more tests to execute in the list of tests (answer yes to test 355). In both cases, the system may perform (answer Yes to test 375) a new reading of the symptom tree and compute a new list of tests. For instance, the application may have performed a first iteration of execution of automatic tests which have a low cost setting into context and performs a second iteration of execution of automatic tests which have a high cost setting into context. All the combinations based on algorithms using symptom tree node parameter computations are possible.

In the preferred embodiment, if the system does not decide on a new iteration of automatic tests, the system decides by preparing a new list of tests which are confirmation tests corresponding to manual only procedures. These tests are the most costly and, with this embodiment, using the principle of possible test iterations, they can be postponed after all the less costly automatic tests are performed.

Figure 4:
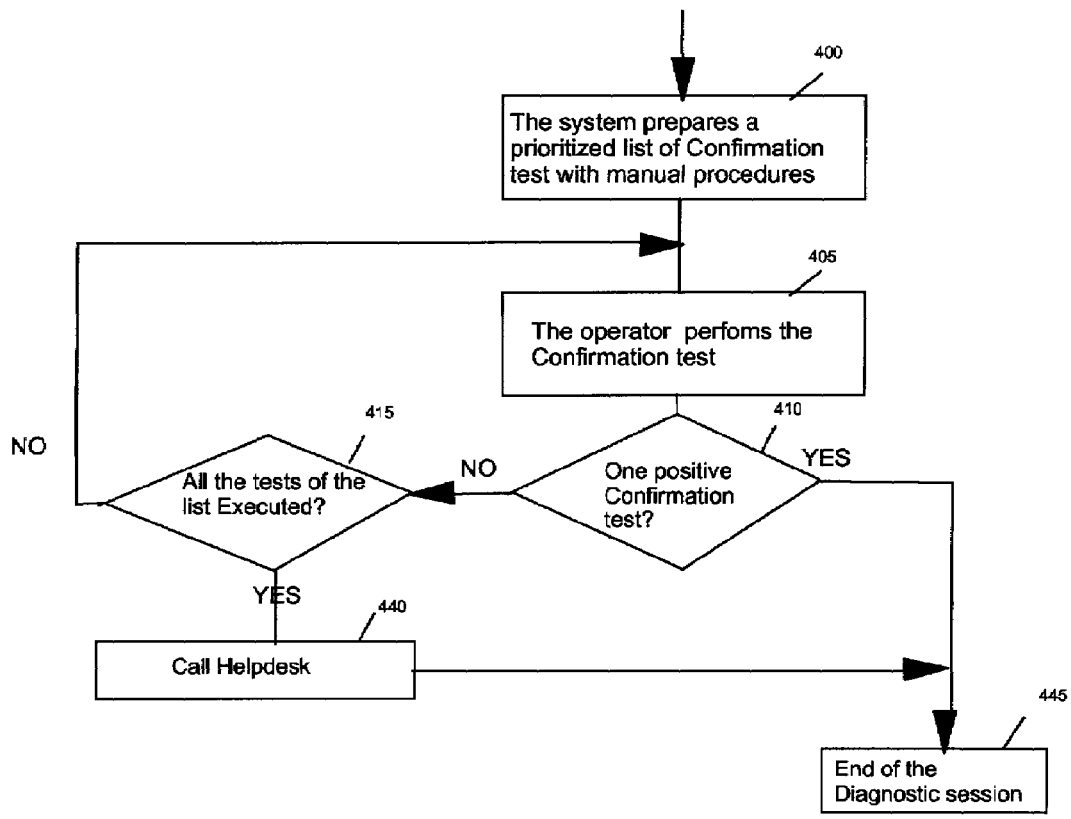

One embodiment applying to a system to be diagnosed and able to collect information from internal elements and/or to exchange information with the computer would comprise only the tests of FIG. 4; that is, the manual procedure tests.

If an automatic test is positive (answer Yes to test 410), the technician is guided by the application to perform on the vehicle the associated confirmation tests to confirm the diagnostic of the diagnostic application. If one confirmation test is positive (answer Yes to test 410), a faulty repairable unit is found, the technician receives the solution to change the reparable unit, and the diagnostic session is ended (445). If no confirmation test is positive (answer No to test 410) and all the confirmation tests on the list are completed (Answer Yes to test 415), no diagnostic corresponding to this vehicle and the symptom has been found by the application and the operator advises (440) the helpdesk of this case and ends the diagnostic session (445).

The operations performed by the helpdesk are well known in the art. If a symptom or a diagnostic is not found in the application, the information on the case is entered by the helpdesk and communicated to the people maintaining the application. A new symptom tree or a new branch in an existing symptom tree must be added in the diagnostic database. In this way, contrary to the CBR approach, the diagnostic application does not provide statistically approaching diagnostic but an exact diagnostic, even if the conclusion can be 'failure unknown to the system'.

It is noted that a criterion for prioritizing tests to be performed may be the statistics on failure mode apparition. This frequency can be stored as a node parameter but, instead of having this parameter entered by content authors maintaining the diagnostic database, this parameter can be created and updated by the system each time a positive FM node is validated. Consequently, the diagnostic method of the preferred embodiment improves not only with the use of a helpdesk but can be improved automatically based on past successful diagnostic sessions. The use of such statistics makes apparent some interesting behaviors of the diagnosed systems. A same symptom tree corresponding to a function of the vehicle can evolve differently according to the model of the vehicle where the same function is used. It is noted, for instance, that the same engine installed in different cars may have different statistics for the same expression of a symptom because of change in its physical implementation in the different vehicles.

Figure 5:
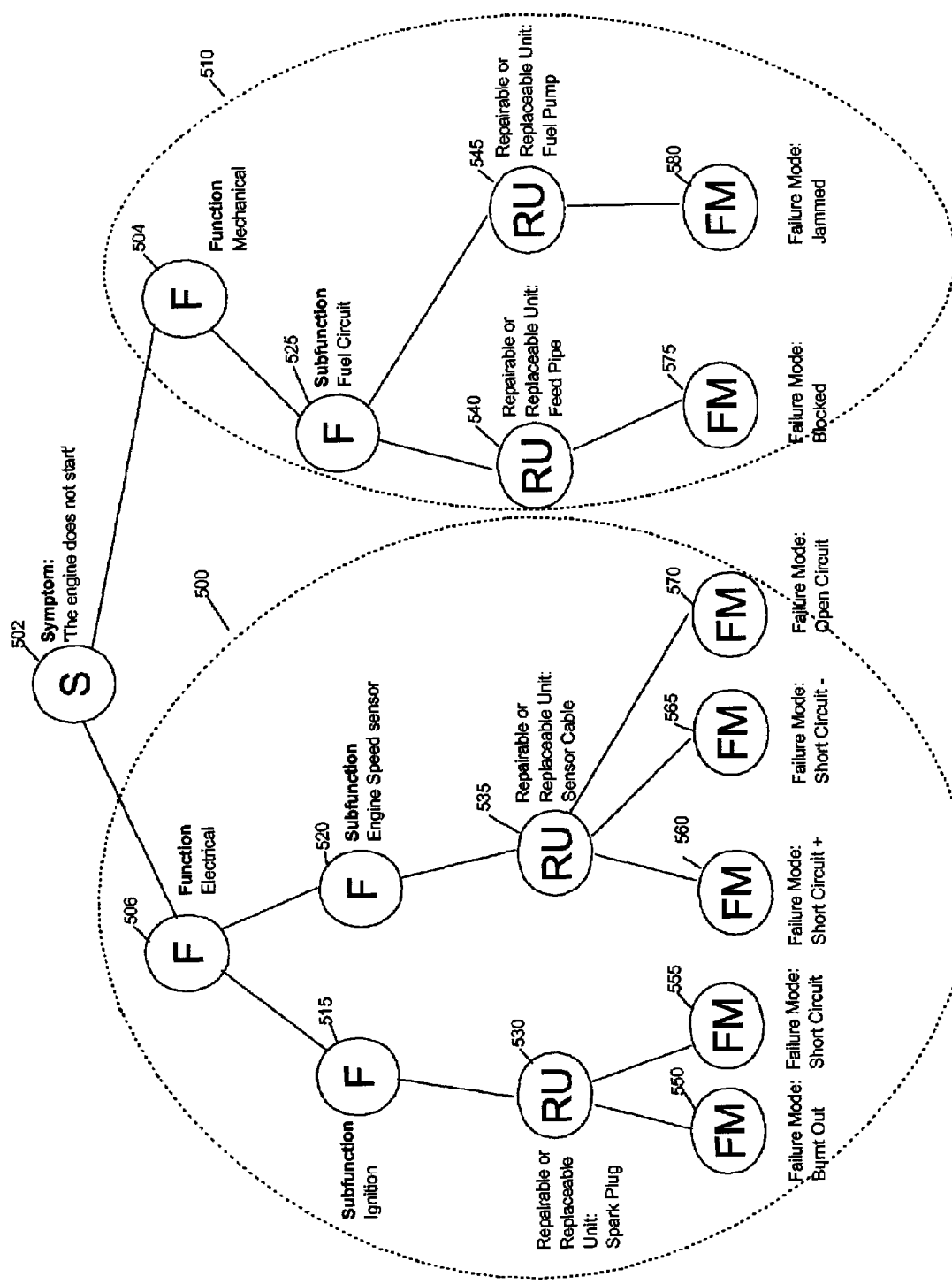
FIG. 5 is one example of a tree of the diagnostic database read by the diagnostic engine.

FIG. 5 is one example of a symptom tree of the diagnostic database built by the diagnostic application and read by the diagnostic engine layer of the application. This tree is used to find the smallest repairable or replaceable part corresponding to a failure in a vehicle detected by a given symptom. The root of the tree is the symptom having sub-trees corresponding to a functional decomposition of the vehicle. This is different from the tree used in the diagnostic methods of the prior art for which each node is a possible reason of the failure. The functional trees have the advantage to be prepared on the basis of the knowledge of the structure of the vehicle but not on the knowledge of the experience of the technician knowledgeable in providing diagnostic of the engine. In the tree of FIG. 5, two functions are associated to the initial symptom. 'The engine does not start' comprehends both electrical and mechanical functions. The functional trees (500, 510) developed under this function have been simplified as they comprise only one level of sub-function (515, 520, 525) attached to each of the function trees. In the real life, functional trees may have more than one level of sub-functions before reaching the leaves. The leaves of the functional trees are the last level of the decomposition, the repairable or replaceable unit (530, 535, 540, 545). To each repairable or replaceable unit is associated one or more failure modes (550, 555, 560, 565, 570, 575, 580). The information forming these trees as the one in FIG. 5 is entered via the operators of the authoring tool. The information entered in the diagnostic database comes from the functional description of the vehicle. There is no specific expertise required in the domain of failures and diagnostics of the vehicle to create this information.

In the preferred embodiment, to each function or RU node of the tree are associated three attributes: the feature model, an automatic test and a confirmation test. The feature model is first used in the diagnostic method because it associates to an element of the vehicle a qualification of the type of vehicle. As described in FIG. 3, the first step of the diagnostic method (300) is an identification of the vehicle configuration. The vehicle type is identified as well as all the options defining its configuration. This consists in validating the feature model for all the functions and repairable units constituting the vehicle. This helps in eliminating in a huge theoretical initial tree having all the options and vehicle types, all the function or RU nodes having a different feature-model than as determined during the step of identification of the vehicle configuration (300).

An automatic test is a test which can be done automatically with the help of a controller component of the vehicle. As already stated, a controller component, so called an ECU, is able to test parameters in the vehicle provided by the sensors. However, an automatic test can be performed if the vehicle has been set into a context. The diagnostic application guides the technician in the garage to set the vehicle in the context: for instance, 'switch off the engine', 'open the driver door', etc. One example of an automatic test can be 'check if battery voltage is greater than 8.5 Volts'. In the diagnostic database, this test can be coded through the authoring tool as the expression 'TENSION_BATTERY,CMM]>8.5. It is noted also that the test expressions can comprise expressions correlated with logical operators, such as OR and/or AND, NOT, etc. The diagnostic engine reading the tree when encountering this test gives the expression to the other layers of the application for conversion into a request using the VCP protocol understandable by the vehicle components. These requests are then sent to the vehicle and executed by the ECUs. In the coded test expression, 'CMM' is an ECU from which the system will read a parameter; 'TENSION_BATTERY' is the parameter and >8.5 is the testing operation. It is noted that the result of an automatic test can give a good indicator of where the failure may reside but does not prove it. Positive automatic tests at failure mode level are always confirmed by a confirmation test. In the preferred embodiment, a confirmation test is optional at function node level and mandatory at failure mode level.

If the confirmation test result is TRUE, the system stops unless there are further confirmation tests at lower nodes. If the confirmation test result is FALSE, the system will not go further in that direction in the tree. The confirmation tests are entered in the database through the authoring tool in the form of a textual expression.

In the tree structure, lower nodes inherit automatic tests from their parent nodes. The automatic test of a node is combined through a logical AND operation with all its inherited automatic tests. For instance, if at the level of a function node (515, 520, 525), the test logical expression is 'Parameter A: x>6', the parameter A is TRUE and is propagated to the lower levels and flagged as inherited. If in one failure mode node (550-580) there is an original test logical expression 'Parameter B: p<4000', if this expression is TRUE, then the real logical expression which is TRUE for this failure mode node is A AND C: that is 'Parameter A: x>6' AND 'Parameter B: p<4000'.

The result of the evaluation of an automatic or confirmation test is either TRUE, FALSE or UNDEFINED. An automatic test is set to UNDEFINED when an error occurred during its evaluation (in general, due to a communication error with the ECU). The result of a confirmation test is set to UNDEFINED by the technician if he does not know the answer (for example, a test that is not doable in the given context). When a sub-expression of a logical expression is UNDEFINED, the result of the evaluation of the complete expression depends on the logical operator used; if A is UNDEFINED, the result of the logical expression A OR B is equal to the evaluation of B. If A or B is UNDEFINED, the logical expression A AND B is evaluated to UNDEFINED. If A is UNDEFINED, the expression NOT(A) is UNDEFINED.

The result of a confirmation test depends on the answer of the technician having performed the confirmation test and having entered the result in the client diagnostic application. The result of an automatic test testing a logical expression is based on an algorithm which can be tuned according to the needs of the diagnostic method user/owner. This choice is flexible because it can take into account the cost of a test, the cost of a component to be exchanged, the number of times the test result was positive, etc. This weight parameter of the test is used by the diagnostic engine for choosing the priority of the nodes to be read in the tree during the successive top-down reading operations of the tree which are explained hereafter in relation to FIG. 7. For instance, a node having stored a significant number of times where the repetitive test expression has been validated as TRUE should be tested in priority because the test has a greater chance to be positive. That is why, in one embodiment, the result TRUE can be modulated by qualifying it with a 'percentage of TRUTH' and a TRUTH weight. The percentage of TRUTH indicates the percentage of the entire expression which is verified. It is computed using the TRUTH weight. If two members of a logical OR are true, for instance, the TRUTH weight is 2; that is the number of parameters making the expression TRUE. The TRUTH percentage in this case is 100%. At a failure mode level, the TRUE weight is influenced by the result of the automatic tests of the parent nodes as the lower nodes inherit the result of expression from the parent nodes 1.

Figure 6:
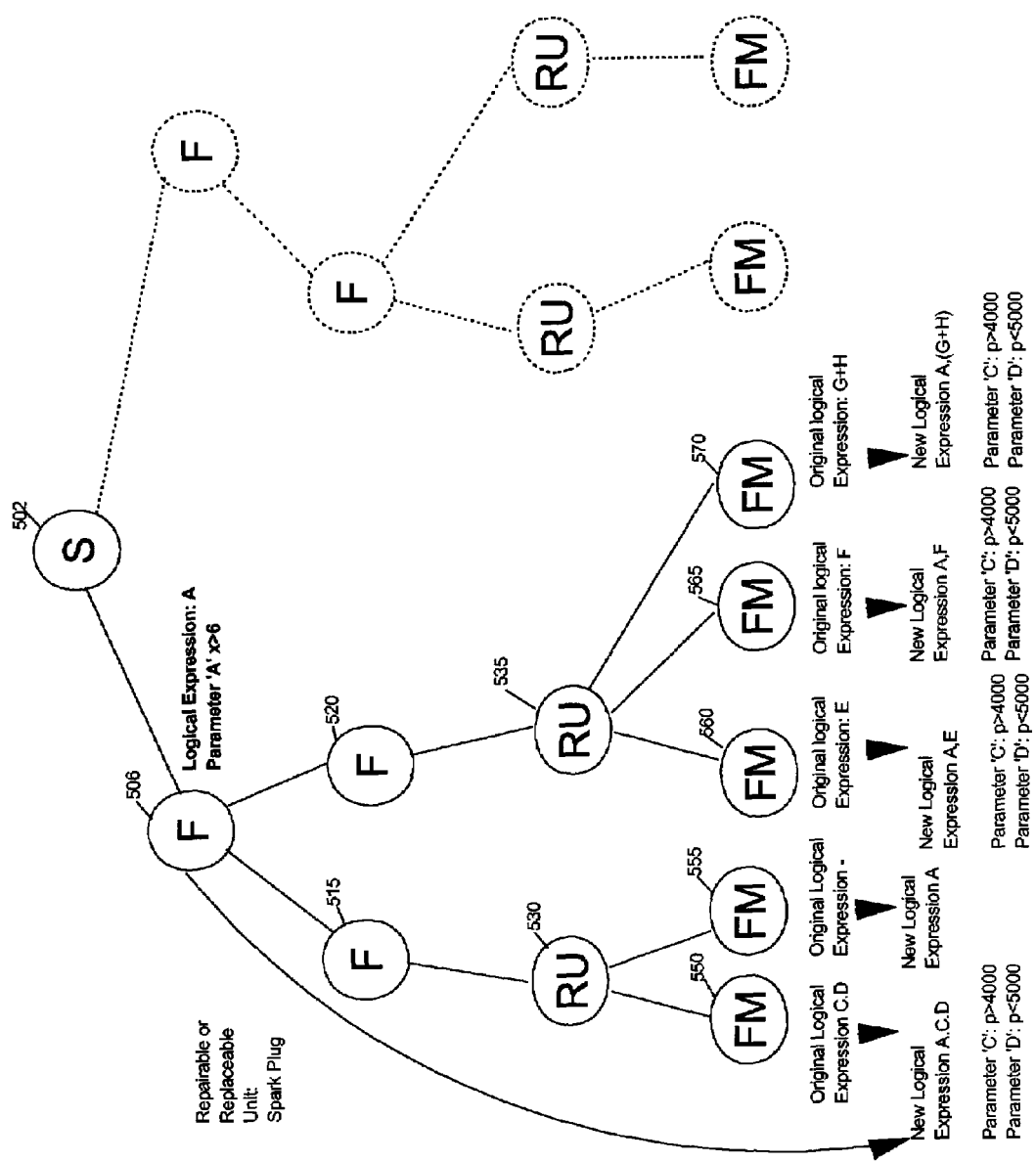
FIG. 6 illustrates the logical expression of the automatic tests of the nodes of the tree of FIG. 5.

An example of this embodiment is given in FIG. 6 representing the logical expressions of automatic tests for the same example of tree as in FIG. 5. In this figure, if C, G and H are TRUE and B, D, E and F are FALSE, then the TRUTH weights and TRUTH percentages (deduced from the TRUTH weights) are as follows:

The automatic test result of failure mode 1 has a TRUTH weight of 2 and a TRUTH percentage of 67%.
The automatic test result of failure mode 2 has a TRUTH weight of 1 and a TRUTH percentage of 100%.
The automatic test result of failure mode 3 has a TRUTH weight of 1 and a TRUTH percentage of 50%.
The automatic test result of failure mode 3 has a TRUTH weight of 1 and a TRUTH percentage of 50%.
The automatic test result of failure mode 4 has a TRUTH weight of 1 and a TRUTH percentage of 50%.
The automatic test result of failure mode 5 has a TRUTH weight of 2 and a TRUTH percentage of 100%.

FIG. 7 is an illustration of the parameters associated with the nodes of a symptom tree according to the preferred embodiment. Some parameters stored in the nodes are used to identify the vehicle in the preferred embodiment. In node 702, the engine type is petrol. Other parameters are for tests; the expressions in nodes 760 and 720 are automatic tests. In nodes 750, 755, 760, 765, 770, the frequency parameter, contrary to the other parameters, is not entered by the content authoring people but updated by the system. It represents the number of times the corresponding node was identified as the failure part by a run of the diagnostic session. In general, the parameters values are used to adapt the way the symptom tree is read and the test prioritized.

Figure 8:
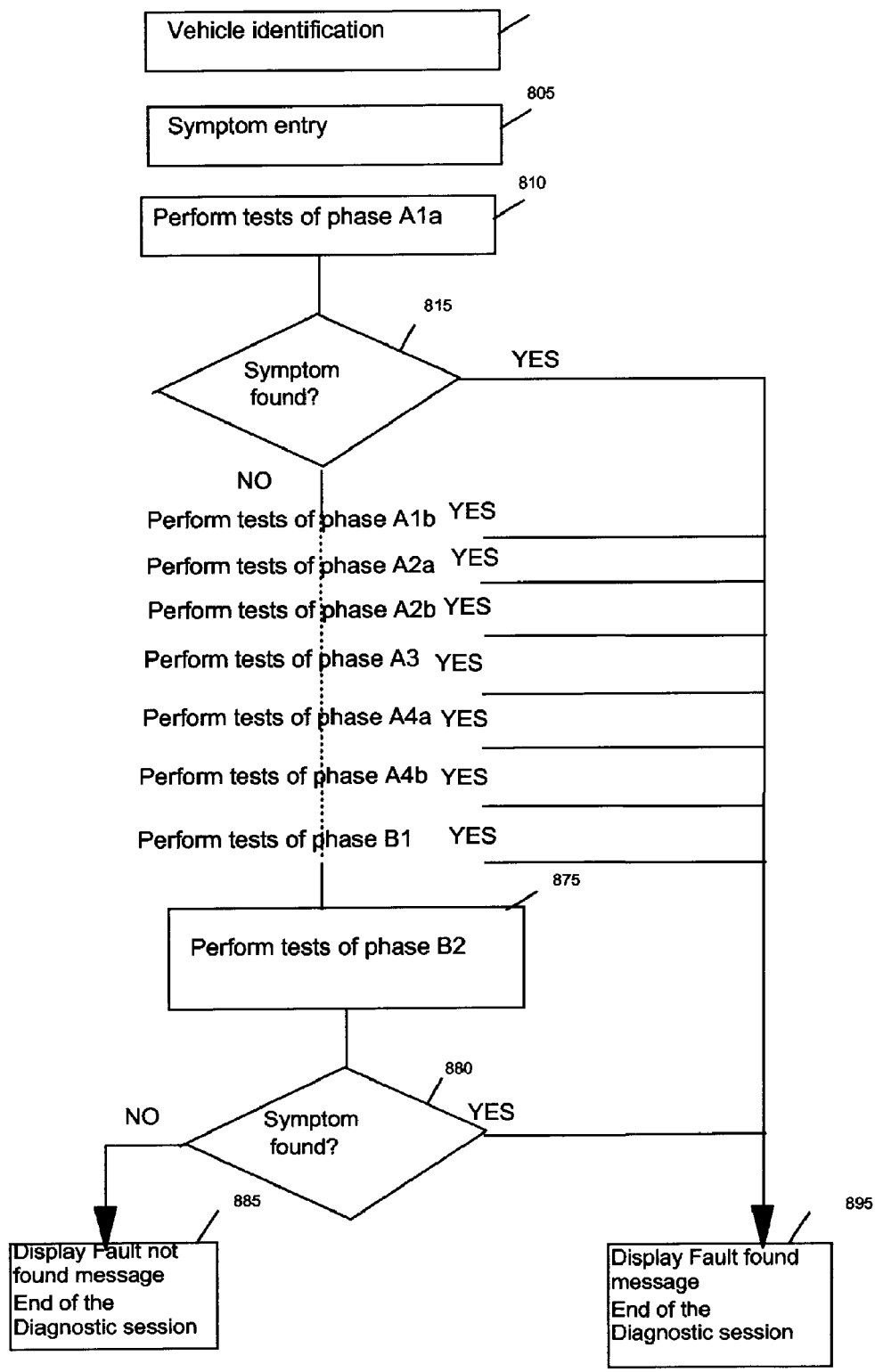
FIG. 8 is the general flow chart of the method of diagnostic according to the preferred embodiment.

FIG. 8 is the general flow chart of the method of diagnostic according to the preferred embodiment. Compared to the flow chart of FIG. 3 and FIG. 4, FIG. 7 illustrates the steps of the method performed by the system for building the symptom trees and choosing the various test iterations. In the preferred embodiment, the phases are optimized to obtain a diagnostic very quickly. It is noted that the more the trees comprise information and the more the phases are optimized, the quicker a diagnostic is obtained.

More generally, it is noted that the more complex the system to be diagnosed is, the more the method is improved. For instance, as discussed above, a method according to the present invention applied to a system which does not include a control unit able to collect information from internal elements and to exchange information with the computer will only comprise manual tests. However, even in this case, the method of the preferred embodiment can be partially applied to the manual test for optimizing the diagnostic determination. For instance, two test iterations can be planned for manual tests according to the difficulty and, thus, the cost of the tests. In a symptom tree, a manual test at a node may have a 'difficulty parameter' value as 'high' or 'low'. A first test iteration will be performed with tests of low difficulty and, if no fault is found, a second iteration can be performed with the high difficulty test. Also, if the frequency of failure mode fault is counted automatically by the system at each diagnostic session and stored at the failure mode node, the frequency value can be taken into account to perform a test iteration with tests at the failure mode nodes having the highest frequency values.

Coming back to the preferred embodiment of the flow chart of FIG. 8, when the garage technician has chosen an entry symptom (805), the diagnosis session may start. The diagnostic engine, which is the program implementing the method of the preferred embodiment, has at this point already identified the vehicle (800) and built the symptom tree by keeping relevant, or eliminating non-relevant, tree nodes for functions, repairable or replaceable units and failure modes according to the vehicle type and vehicle functions corresponding to the symptom. As described above, the data associated to the symptom tree nodes can be confirmation and/or automatic test descriptions (at the level of function, sub-function and failure mode of repairable unit nodes but not to repairable unit nodes) and other parameters identifying the vehicle configuration, value of the test, frequency count of faults on a failure mode node etc. The diagnostic engine proceeds in sequential steps classified into test iterations forming two main phases and, within each phase, different techniques are employed to accelerate convergence to the failure mode. As soon as the diagnostic engine finds a validated root cause (i.e. a failure mode for which the result of the associated confirmation test is true), the diagnosis session ends (895). Another possibility is that the failure present on the system under diagnostic is not defined in the database. In this case, the session also ends but with a Fault Not Found result (885). In this particular case, the technician is mandated to call the technical helpdesk that will continue the diagnostic session remotely. In this case, the session can stop at function level (if there is a TRUE confirmation test associated to it), indicating that the fault is related to this function but that it is not defined in the content.

The diagnosis session is split into two main phases. In the first phase, phase A, the diagnostic engine exploits communication capabilities of on-board electronics and, in the second phase, phase B, different approaches are used that are essentially confirmation test based. A confirmation test is either a manual test, mandatory, executed for confirming a positive result of an automatic test, or a confirmation test may be an entirely manual test performed to 'confirm a node' of the symptom tree.

Phase A is sub-divided into four sub-phases, which are, in turn, sub-divided according to test context and the level in the symptom tree at which tests are conducted. The context is the manual operations performed by the technician allowing the execution of an automatic test on the vehicle. The technician sets the vehicle into a certain context before the automatic test can be performed. In reality, in the symptom tree, more than one automatic test may require the same context. For this reason, when the technician has set a given context, the computer executes all the automatic tests of a test iteration corresponding to this same context. It is reminded that one automatic test execution associated to one node is, in fact, an evaluation of the logical expression associated to that node. Consequently, performing the automatic test iteration is a succession of one step performed by the technician to set the vehicle into context and the successive steps for evaluating all the logical expressions of the nodes of the symptom tree for which is required the same setting into context.

In phase A1a (810), the automatic tests are evaluated for low cost contexts at function and failure mode levels. A low cost context may be, for instance, "put the ignition on", a simple requirement clearly not necessitating the dismantling of parts. Each test returns a True/False/Undefined result. The diagnostic engine analyzes the results, retains the nodes that return a logical expression truth percentage of 100% and eliminates nodes for which logical expression truth percentage is less than 100% and those that require component exchange. Once this is done, a confirmation test must be performed for the selected nodes. The diagnostic engine sorts the confirmation tests in a prioritized list according to a formula taking into account the following:
    the difficulty of its undertaking,
    the frequency of occurrence and/or likelihood of the failure mode,
    the truth weight.

When the result of a confirmation test is true, then the diagnostic engine has found the cause of the symptom and stops (answer Yes to test 815). If all results are false (answer No to test 815), the diagnostic engine moves on to the next test phase, A1b.

The same test phase flow chart illustrated in FIG. 8 for phase A1a (810, 815, 895) is repeated but not fully represented in FIG. 8 for the other test phases (A1b, A1a, A2b, A3, A4a, A4b, B1).

Coming back to the test phase A1b, the same procedure is used during the A1b test phase as for the A1a phase with the exception that it takes place in a top down approach starting at function level and descending to failure mode level. This procedure is followed for each low cost context. In phase A1b, the diagnostic engine sorts the confirmation tests according to the same formula as that used in A1a at failure mode level and at function level, a formula taking into account the following:
    the difficulty of its undertaking at function level,
    the frequency of occurrence and/or likelihood of the failure mode at the child node level,
    the truth weight at function level.

Phases A2a and A2b run the same procedure as those of A1a and A1b, with the exception that the automatic test ordering takes place for high cost contexts. Phases A2a and A2b use the same formula as in phases A1a and A1b.

Phase A3 concerns all the remaining confirmation tests at failure mode level for which the automatic tests were 100% true, in all contexts, but on RUs tagged as requiring the replacement of the RU to ensure it is not functioning. The test prioritization formula takes into account the following variables:
    the difficulty of its undertaking,
    the frequency of occurrence and/or likelihood of the failure mode,
    the truth weight,
    the cost of the component that requires exchange to undertake confirmation test.

On completion of phase A3, all automatic tests for which logical expressions were 100% true have been used up (at high and low cost contexts, and at all levels of the symptom tree). In phase A4, therefore, confirmation tests are run for which logical expressions are not 100% true but flagged in the authoring tool as being eligible as part of non-100% true logical expressions. Phases A4a and A4b use the same formula as in phases A1a and A1b.

Phase B is split into two sub-phases, B1 and B2. In phase B1, confirmation tests are performed in a top down approach. The order of confirmation tests complies with the following variables at failure mode level:
    confirmation test difficulty,
    frequency of occurrence and/or likelihood factor.
The order of confirmation tests complies with the following variables at function level:
    confirmation test difficulty at function level,
    frequency of occurrence and/or likelihood factor at lowest child node level.

Phase B2 (875) extends beyond B1 in that it concerns failure modes tagged with replacement repairable units (RUs). The order of confirmation tests complies with the following variables:
    confirmation test difficulty,
    frequency of occurrence and/or likelihood factor,
    cost of the component to be exchanged to perform the confirmation test.

When no result of a Phase B2 (875) confirmation test is true, then at 880 the diagnostic engine has not found the cause of the symptom and stops with a Fault Not Found result (885). Since this is not indicated in the flow chart, as this corresponds to a lack in the symptom tree, this information is given to a helpdesk which will communicate this to the vehicle technical specialists who will find a fault corresponding to this symptom. The content authors will then update the symptom tree database accordingly to allow the next diagnostic session being able to diagnose this symptom successfully.

Additionally, to improve the efficiency of the diagnostic method, specific node relationships may be optionally leveraged in the diagnostic engine when dealing with specific cases.

One example is: if an identified failure mode node FM1 belongs to a function A which is implied by a function B, then the confirmation test of function B (which exists due to the implication link) must be done before the confirmation test of FM1. There are two cases:
    if the confirmation test of function B is true, the diagnostic engine retains only this branch, eliminates the remaining branches of the symptom and continues the phase in progress,
    If the confirmation test of function B is false, this function and its children are eliminated.

A second example is that a relationship may be defined between symptoms:
    there is a link between so called customer symptom and expert symptom at function level. The two are combined during the symptom tree loading to form a single symptom. This principle is active at all test phases.
    There is a link to an expert symptom from a failure mode. In this case, the diagnostic session will continue on the expert symptom if the confirmation test associated to the failure mode bearing the link is validated to TRUE.

Customer symptoms are symptoms as expressed by the end-user of the system (for example, 'my engine does not start' or 'my engine emits black smoke'). Expert symptoms are symptoms as expressed by a diagnostic technician (for example, 'Fuse XYZ blown' or 'Impossibility to download new software in the ECU'). Generally, a diagnostic session starts from a client symptom but may continue on expert symptoms. (Example: my engine does not start because fuse 13 is blown is the conclusion of the client symptom and fuse 13 is blown because there is a short-circuit on pin 31 of the engine management ECU is the conclusion of the expert symptom). Transition from a client symptom to an expert symptom is transparent for the user of the diagnostic tool. This kind of link between symptoms is used to manage cascading failures where a given failure is the root cause of another failure which is itself the cause of the end-user complaint.

Another use of expert symptom is to share diagnostic content between symptoms by using a multi-purpose expert symptom (for example, the expert symptom 'communication bus between ECUs is damaged' is common to many customer symptoms as this expert symptom can lead to multiple customer complaints). This usage of expert symptoms is helpful for reducing the content creation workload by introducing a notion of reuse of common parts. It can also be used to move from a domain of expertise to another. For complex systems, such as a vehicle, content creation is spread among multiple authors with distinct domains of expertise. However, the diagnostic of some systems (such as an engine) might lead to other domains of expertise (for example, the car radio). By using symptom links under functions, a content author is able to use symptoms created by other authors in other domains.

The following table is an example of characteristics provided for each test phase. The 'level' is the level in the symptom tree. A test phase may apply to failure mode nodes only or function nodes only, etc. The 'auto test context' gives the value of the parameter stored at the level of the function, sub-function and failure mode nodes to qualify the cost of the automatic test. It can be high, low or not applicable if the test is manual. The 'condition' is the condition to choose the nodes of the test phase. For instance, test phase A4 is entered when all the test phases with automatic tests A1, A2, A3 with test logical expressions 100% are unsuccessful. So, in test phase A4, nodes for which the logical expression results of the automatic tests are less than 100% true, are considered. The 'ordering' applies to the prioritization of the confirmation tests. The confirmation tests are executed either for confirming a positive automatic test or to confirm a node having only a manual test. Before being executed, the confirmation tests are listed in a prioritized list by employing algorithms using the values of parameters read in the nodes. In this example, some formulas so called A, B, etc., have been previously defined by the administrator of the diagnostic method and applied for all the symptom trees for coherency reasons. The choice of formulas allows fine tuning of the way the symptom tree is read in order to prioritize the confirmation and automatic test lists. It is noted that any improvement may be brought to these test phases by improving the formulas or the number of parameters stored in the nodes.

| Phase A1a | Level | Native & Inherited Failure Modes (excluding tagged Failure Modes) |
|---|---|---|
| | Auto Test Context | Low Cost |
| | Condition | Logical Expression 100% True |
| | Ordering | According to Formula A. Parameter list - the difficulty of its undertaking - the frequency of occurrence and/or likelihood of the failure mode - the truth weight. |
| | Tagged as requiring RU replacement | No |
| Phase A1 3 | Level | Functions and failure modes that have inherited true logical expressions |
| | Auto Test Context | Low cost |
| | Condition | Logical expression 100% True |
| | Ordering | According to Formula A at failure mode level. Parameter list - the difficulty of its undertaking - the frequency of occurrence and/or likelihood of the failure mode - the truth weight. according to Formula B at function level. Parameter list - the difficulty of its undertaking at function level - the frequency of occurrence and/or likelihood of the failure mode at the child node level - the truth weight at function level. |
| | Tagged as requiring RU replacement | No |
| Phase A2a | Level | Native & Inherited Failure Modes (excluding tagged Failure Modes) |
| | Auto Test Context | High cost |
| | Condition | Logical Expression 100% True |
| | Ordering | According to Formula A. Parameter list - the difficulty of its undertaking - the frequency of occurrence and/or likelihood of the failure mode - the truth weight. |
| | Tagged as requiring RU replacement | No |
| Phase A2(3 | Level | Functions |
| | Auto Test Context | High cost |
| | Condition | Logical Expression 100% True |
| | Ordering | according to Formula A at failure mode level. Parameter list - the difficulty of its undertaking - the frequency of occurrence and/or likelihood of the failure mode - the truth weight. according to Formula B at function level. Parameter list - the difficulty of its undertaking at function level - the frequency of occurrence and/or likelihood of the failure mode at the child node level - the truth weight at function level. |

| | | -continued |
|---|---|---|
| | Tagged as requiring RU replacement | No |
| Phase A3 | Level | Native & Inherited Failure Modes (tagged failure modes) |
| | Auto Test Context | Low & High Cost |
| | Condition | Logical Expression 100% True |
| | Ordering | According to Formula C. Parameter list - the difficulty of its undertaking - the frequency of occurrence and/or likelihood of the failure mode - the truth weight - the cost of the component that requires exchange to undertake. confirmation test |
| | Tagged as requiring RU replacement | Yes |
| Phase A4a | Level | Failure modes |
| | Auto Test Context | Low and High Cost |
| | Condition | Logical expression not 100% True but flagged as eligible as non-100% true |
| | Ordering | According to Formula A. Parameter list - the difficulty of its undertaking - the frequency of occurrence and/or likelihood of the failure mode - the truth weight. |
| | Tagged as requiring RU replacement | No |
| Phase A4p | Level | Top down, from functions to failure modes |
| | Auto Test Context | Low and High Cost |
| | Condition | Logical Expression not 100% True but flagged as eligible as non-100% true |
| | Ordering | According to Formula A at failure mode level. Parameter list - the difficulty of its undertaking - the frequency of occurrence and/or likelihood of the failure mode - the truth weight. according to Formula B at function level. Parameter list - the difficulty of its undertaking at function level - the frequency of occurrence and/or likelihood of the failure mode at the child node level - the truth weight at function level. |
| | Tagged as requiring RU replacement | No |
| Phase B1 | Level | Top down, from functions to failure modes |
| | Auto Test Context | N/A |
| | Condition | No logical expression associated or logical expressions false (during phases A) but tagged as "Not exclusive" |
| | Ordering | According to formula D at failure mode level parameter list: - confirmation test difficulty - frequency of occurrence and/or likelihood factor. According to formula E at function level. Parameter List - confirmation test difficulty at function level - frequency of occurrence and/or likelihood factor at lowest child node level. |
| | Tagged as requiring RU replacement | No |
| Phase B2 | Level | Failure Mode |
| | Auto Test Context | N/A |
| | Condition | Failure of B1 phase |
| | Ordering | According to formula F. Parameter List - Confirmation test difficulty - frequency of occurrence and/or likelihood factor - cost of the component to be exchanged to perform the confirmation test. |
| | Tagged as requiring RU replacement | Yes |

Figure 9:
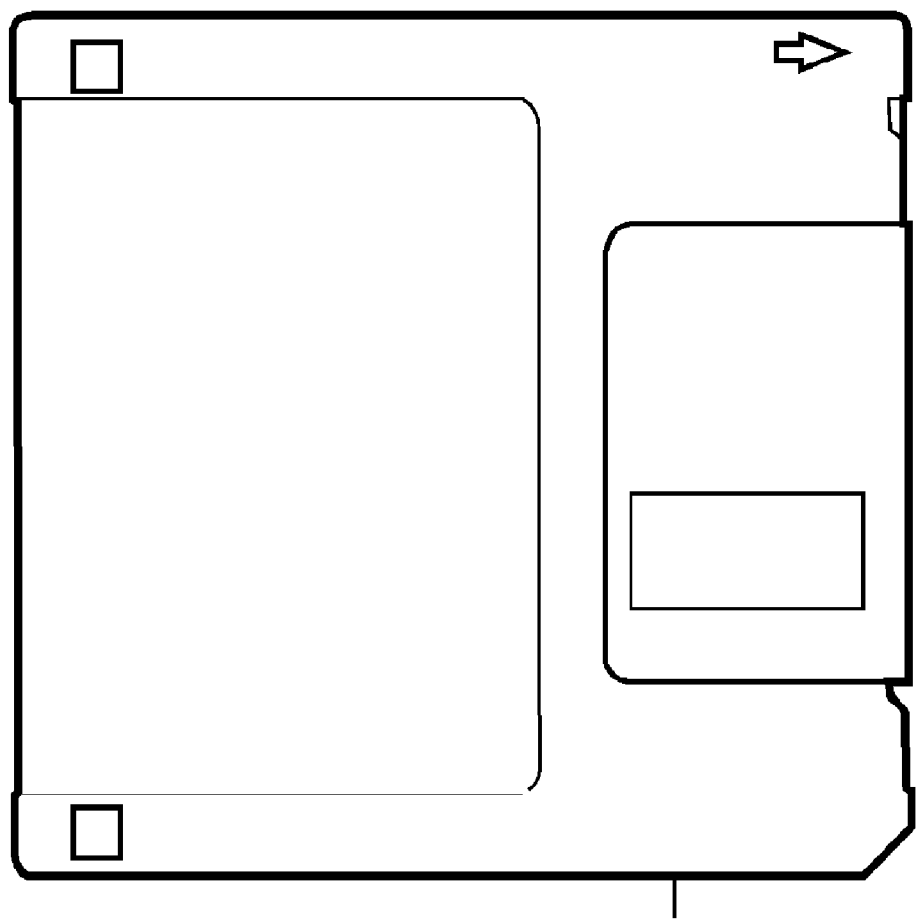
FIG. 9 is plan view of a computer-readable medium or carrier comprising an embodiment of the present invention tangibly embodied in a computer program residing thereon.

FIG. 9 shows a computer-readable medium in the form of a floppy disc 900 for containing a software implementation of a computer program to carry out the various steps of a diagnostic test according to the present invention. Other machine readable storage mediums are fixed hard drives, optical discs, magnetic tapes, semiconductor memories, such as read-only memories (ROMs), programmable (PROMs), etc. The article containing this computer readable code is utilized by executing the code directly from the storage device, or by copying the code from one storage device to another storage device, or by transmitting the code on a network for remote execution.

While preferred embodiments of the invention have been described herein, variations in the design may be made, and such variations may be apparent to those skilled in the art of diagnostic testing methods and systems, computer architecture systems and methods, as well as to those skilled in other arts. The present invention is by no means limited to the specific diagnostic system and method embodiments, programming language and exemplary programming commands illustrated above, and other software and hardware implementations will be readily apparent to one skilled in the art. The scope of the invention, therefore, is only to be limited by the following claims.

What is claimed is:

1. A method for diagnosing a system-under-test, comprising:
   identifying a symptom;
   selecting each of a first series of function tests associated with the symptom on the system-under-test and a first parameter value;
   performing each of the first series of function tests until a positive first series function test result is generated or until each of the first series of function tests is performed and generates a negative test result;
   responsive to the generated positive first series function test result, selecting and performing each of a first series of dependent tests, each associated with the positive first series function test result and the first parameter value until a positive first series dependent test result is generated or until each of the first series of dependent tests is performed and generates a negative test result;
   responsive to the generated positive first series dependent test result, identifying a system element associated with the generated positive first series dependent test result as a failing element and selecting and performing each of a first series of failure tests associated with the failing element and the first parameter value until a positive first series failure test result is generated or until each of the first series of failure tests is performed and generates a negative test result;
   identifying a failure mode associated with the generated first series positive failure test result;
   determining that no failure mode is found in response to the each of the performed first series of failure tests generating negative test results; and
   in response to the each of the performed first series of function tests generating negative test results and the each of the performed first series of dependent tests generating negative test results, determining that no failing element is found and ordering a second series of function tests, a second series of dependent tests and a second series of failure tests, wherein each of the second series of function tests, the second series of dependent tests and the second series of failure tests are associated with a second parameter value;
   wherein the first and the second parameter values comprise a test cost; and
   wherein the selecting the each of the first series of function tests, the first series of dependent tests and the first series of failure tests comprises selecting a test having a low test cost value, and the ordering the second series of function tests, the second series of dependent tests and the second series of failure tests comprises selecting a test having a higher test cost value relative to the low test cost value.

2. The method of claim 1, further comprising:
   identifying the system-under-test; and
   selecting each of at least one of the first series of function tests, the first series of dependent tests and the first series of failure tests responsive to identifying the system-under-test.

3. The method of claim 1, further comprising:
   collecting system-under-test variables from at least one system-under-test element;
   providing an automatic test defined as a logical expression of the system-under-test variables, a system-under-test context and an associated manual-confirmation; and
   wherein at least one of the performing the first series of function tests, the first series of dependent tests and the first series of failure tests further comprises:
   performing an automatic test responsive to system-under-test variables values and by computing logical expressions;
   if a computed logical expression is true, executing an associated manual-confirmation test;
   if the associated manual-confirmation test generates a positive result, then performing a series of tests associated with the manual-confirmation test until the positive result is generated and reporting a positive test result; or reporting a negative test result.

4. The method of claim 1, further comprising computing a frequency count of failure findings for each test at the end of a diagnostic session; and
   computing at least one of the first and the second parameter values responsive to the frequency count.

5. A diagnostic system, comprising a computer processing means configured to:
   apply logic to select each of a first series of function tests responsive to an association of each of the selected tests with an identified symptom and a first parameter value and perform each of the selected first series of function tests until a positive function test result is generated or until each is performed and generates a negative result;
   responsive to a first series positive junction test result, select each of a first series of dependent tests associated with the positive function test result and the first parameter value and perform each of the selected first series of dependent tests until a positive dependent test result is generated or until each is performed and generates a negative result;
   responsive to a first series positive dependent test result, identify a system element associated with the positive dependent test result as a failing element, select each of a first series of failure tests associated with the failing element and the first parameter value and perform each of the selected first series of failure tests until a positive failure test result is generated or until each is performed and generates a negative result;
   identify a failure mode associated with the generated first series positive failure test result or determine that no failure mode is found in response to the each of the performed first series of failure tests generating negative test results; and determine that no failing element is identified in response to the each of the performed first series of function and dependent tests generating negative results; and in response to determining that no failing element is identified, order a second series of function tests, a second series of dependent tests and a second series of failure tests responsive to an association of each of the selected second series tests with a second parameter value;

wherein the first and second parameter values comprise a test cost; and wherein the computer means is further configured to select each of the first series of function tests, the first series of dependent tests and the first series of failure tests by selecting tests having a low test cost value, and order each of the second series of function tests, the second series of dependent tests and the second series of failure tests by selecting tests having a higher test cost value relative to the low test cost value.

6. The system of claim 5, wherein the computer means further configured to select each of at least one of the first series of function tests, the first series of dependent tests and the first series of failure tests in response to identifying a system-under-test.

7. The system of claim 5, wherein the computer means is further configured to collect system-under-test variables from at least one system-under-test element;

define an automatic test as a logical expression of the system-under-test variables, a system-under-test context and an associated manual-confirmation; and perform at least one of the first series of the function, the dependent and the failure tests by performing an automatic test responsive to system-under-test variables values and computing logical expressions;

execute an associated manual-confirmation test if a computed logical expression is true, perform a next associated manual test if the associated manual-confirmation test generates a positive result and report a positive test result; or report a negative test result.

8. The system of claim 5, wherein the computer means is further configured to compute a frequency count of failure findings for each test at the end of a diagnostic session; and compute at least one of the first and the second parameter values responsive to the frequency count.

9. The system of claim 5, wherein at least one of the first and the second parameter values is determined by the computer means in response to a result of a previous diagnostic session.

10. A method comprising:

providing computer executable program code to be deployed to and executed on a computer system, wherein the computer executable program code is stored in a computer readable storage medium;

the program code comprising instructions which, when executed on the computer system, causes the computer to:

select each of a first series of function tests responsive to an association of each of the selected tests with an identified symptom and a first parameter value and perform each of the selected first series of function tests until a positive function test result is generated or until each is performed and generates a negative result;

responsive to a first series positive function test result, select each of a first series of dependent tests associated with the positive function test result and the first parameter value and perform each of the selected first series of dependent tests until a positive dependent test result is generated or until each is performed and generates a negative result;

responsive to a first series positive dependent test result, identify a system element associated with the positive dependent test result as a failing element, select each of a first series of failure tests associated with the failing element and the first parameter value and perform each of the selected first series of failure tests until a positive failure test result is generated or until each is performed and generates a negative result;

identify a failure mode associated with the generated first series positive failure test result or determine that no failure mode is found in response to the each of the performed first series of failure tests generating negative test results; and determine that no failing element is identified in response to the each of the performed first series of function and dependent tests generating negative results; and in response to determining that no failing element is identified, order a second series of function tests, a second series of dependent tests and a second series of failure tests responsive to an association of each of the selected second series tests with a second parameter value, wherein the first and second parameter values comprise a test cost;

select each of the first series of function tests, the first series of dependent tests and the first series of failure tests by selecting tests having a low test cost value; and select each of the second series of function tests, the second series of dependent tests and the second series of failure tests by selecting tests having a higher test cost value relative to the low test cost value.

11. The method of claim 10, wherein the program code, when executed on a computer, causes the computer to select each of at least one of the first series of function tests, the first series of dependent tests and the first series of failure tests responsive to a identifying the system-under-test.

12. The method of claim 10, wherein the program, when executed on a computer, causes the computer to:

collect system-under-test variables from at least one system-under-test element;

provide an automatic test defined as a logical expression of the system-under-test variables, a system-under-test context and an associated manual-confirmation; and perform at least one of the first series function tests, the first series dependent tests and the first series failure tests by:

performing an automatic test responsive to system-under-test variables values and by computing logical expressions;

if a computed logical expression is true, executing an associated manual-confirmation test;

if the associated manual-confirmation test generates a positive result, then the performing a series of tests associated with the manual-confirmation test until a positive result is generated and reporting a positive test result; or reporting a negative test result.

13. The method of claim 10, wherein the program code, when executed on a computer, causes the computer to compute a frequency count of failure findings for each test at the end of a diagnostic session; and compute at least one of the first and second parameter values responsive to the frequency count.

14. A method for deploying an application for diagnosing a system-under-test, comprising providing a computer infrastructure being operable to:

select each of a first series of function tests responsive to an association of each of the selected tests with an identified symptom and a first parameter value and perform each of the selected first series of function tests until a positive function test result is generated or until each is performed and generates a negative result;

responsive to a first series positive function test result, select each of a first series of dependent tests associated with the positive function test result and the first parameter value and perform each of the selected first series of dependent tests until a positive dependent test result is generated or until each is performed and generates a negative result;

responsive to a first series positive dependent test result, identify a system element associated with the positive dependent test result as a failing element, select each of a first series of failure tests associated with the failing element and the first parameter value and perform each of the selected first series of failure tests until a positive failure test result is generated or until each is performed and generates a negative result;

identify a failure mode associated with the generated first series positive failure test result or determine that no failure mode is found in response to the each of the performed first series of failure tests generating negative test results; and determine that no failing element is identified in response to the each of the performed first series of function and dependent tests generating negative results;

in response to determining that no failing element is identified, order a second series of function tests, a second series of dependent tests and a second series of failure tests responsive to an association of each of the selected second series tests with a second parameter value, wherein the first and second parameter values comprise a test cost;

select each of the first series of function tests, the first series of dependent tests and the first series of failure tests by selecting tests having a low test cost value; and select each of the second series of function tests, the second series of dependent tests and the second series of failure tests by selecting tests having a higher test cost value relative to the low test cost value.

15. The method of claim 14, wherein the computer infrastructure is further operable to select each of at least one of the first series of function tests, the first series of dependent tests and the first series of failure tests responsive to identifying the system-under-test.

16. The method of claim 14, wherein the computer infrastructure is further operable to collect system-under-test variables from at least one system-under-test element;

provide an automatic test defined as a logical expression of the system-under-test variables, a system-under-test context and an associated manual-confirmation; and perform at least one of the first series of function tests, the first series of dependent tests and the first series of failure tests by:

performing an automatic test responsive to system-under-test variables values and by computing logical expressions;

if a computed logical expression is true, executing an associated manual-confirmation test;

if the associated manual-confirmation test generates a positive result, then the performing a series of tests associated the manual-confirmation test until a positive result is generated and reporting a positive test result; or reporting a negative test result.

17. The method of claim 14, wherein the computer infrastructure is further operable to compute a frequency count of failure findings for each test at the end of a diagnostic session; and compute at least one of the first and the second parameter values responsive to the frequency count.

* * * * *